April 6, 1926.
G. PONCET
1,579,334
MICROMETRIC PLUG GAUGE
Filed Oct. 2, 1919
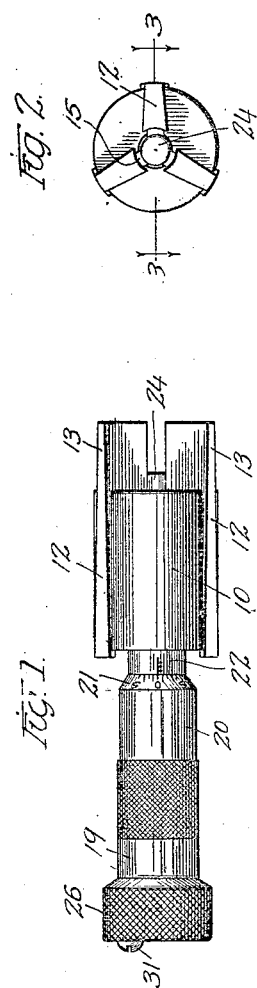
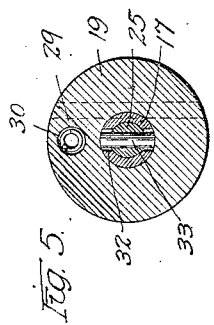
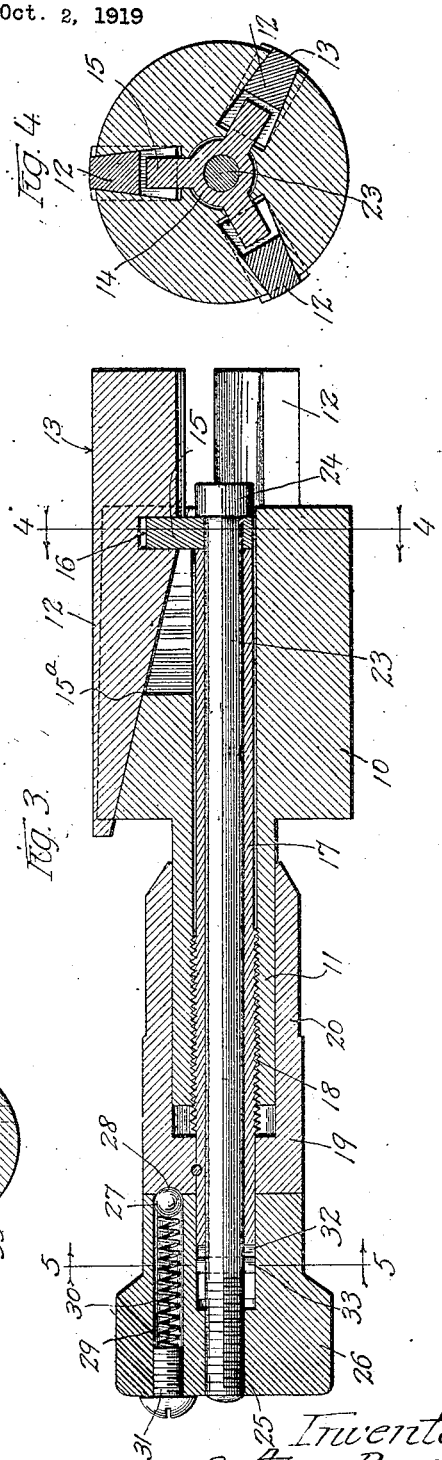
Inventor
Gustave Poncet
Offield Towle Graves & Soans Attys.

Patented Apr. 6, 1926.

1,579,334

UNITED STATES PATENT OFFICE.

GUSTAVE PONCET, OF CHICAGO, ILLINOIS.

MICROMETRIC PLUG GAUGE.

Application filed October 2, 1919. Serial No. 327,970.

*To all whom it may concern:*

Be it known that I, GUSTAVE PONCET, a citizen of Switzerland, residing at Chicago, in the county of Cook and State of Illinois, United States of America, have invented certain new and useful Improvements in Micrometric Plug Gauges, of which the following is a specification.

My invention relates to plug gauges of that type in which the external diameter of the plug may be adjusted to fit within certain prescribed limits, holes or apertures of varying diameter, the adjustment being effected micrometrically.

The principal objects of the invention are to provide a plug gauge of the class described, having means for changing the diameter thereof in such a manner that the change in the diameter is readily ascertained; to provide a variable plug gauge of the micrometer type, capable of being used in substantially the same manner as an ordinary micrometer; to provide improved means for locking the gauge in any position or desired adjustment; to provide a gauge of the class described which may be manufactured accurately and in standard dimensions by approved shop practice and machinery; to provide a plug gauge of the class described which shall be neat and compact in appearance, simple and convenient to manipulate, simple and inexpensive to manufacture, rugged and durable in service, and which will not lose its accuracy in use, and in general to provide an improved construction of the character referred to.

In the drawings illustrating my invention as applied to a cylindrical plug gauge Fig. 1 is a side elevation of said gauge; Fig. 2 is an end elevation of said gauge shown in Fig. 1; Fig. 3 is a section taken on the line 3—3 of Fig. 2; Fig. 4 is a section taken on the line 4—4 of Fig. 3; and Fig. 5 is a section on the line 5—5 of Fig. 3.

Referring to the drawings, 10 represents a cylindrical plug or body of steel, having a reduced rear extension 11, which takes the form of a sleeve, the hole in which sleeve is extended thru the body 10. The body 10 of the gauge serves as a guide for a set of three jaws or sliding parts 12, mounted in inclined grooves or slots formed in the exterior of the body 10.

As shown best in Figs. 2 and 4, the said jaws 12 are dove-tailed to fit snugly in similarly formed body slots, the floors of the slots acting as inclined tracks or cams which, when the jaws are moved along said slots, cause the jaws to move relatively to or from the axis of the body. The exterior surface 13 of the jaws or sliding parts 12 are finished concentric or parallel with the axis of the body, so that the outer surfaces of the jaws will fit a cylinder of the diameter for which the plug gauge is set or adjusted.

Preferably the radius or curvature of the said outer surface is made not greater than the radius of curvature of the body, so that the jaws will always have contact at the median lines of their curved surface, regardless of the diameter of the hole in which the plug gauge is being used.

It will be understood that the plug gauges constructed according to my invention are made in various sizes, for instance inch and a half, inch and three-quarters, two inches, two and one-quarter inches, and etc., each gauge serving for all diameters between its own minimum diameter and the minimum diameter of the next larger size.

Means are provided for effecting accurately, efficiently, and uniformly, corresponding action of the jaws. Such means comprises a member for simultaneously moving all of the jaws longitudinally of the body, it being understood that the jaws and slots containing them are all uniform in slope, so that a given longitudinal movement of each jaw will cause a prescribed and uniform movement radially of each jaw of the set.

Hence, it is merely necessary to note the taper or degree of slope of the slots with reference to the axis of the body and the amount of movement of the jaws longitudinally of the axis, to measure the increase in diameter caused by such longitudinal movement.

The numeral 14 represents a triple-arm spider symmetrically arranged with respect to the jaws 12, the end of each arm 15 of the said spider 14, extending radially outward into a snugly-fitting slot 16 in the corresponding jaw of the set.

The spider 14 is of substantial thickness so that it will not bend or become distorted by the power applied thereto and is capable of sliding in the slot 16 when the jaw moves to or from the axis of the body.

It will be observed that the bottoms of the inclined jaw guideways are slotted as shown at 15ª in Fig. 3, in order to permit longitudinal movement of the arms 15, while at the same time preventing said arms from rotating.

The position of the spider 14 is controlled and determined by the hollow plunger 17, contained within the sleeve 11 and having its outer end threaded to fit corresponding threads 18, formed in the interior of the end of the said sleeve or extension 11. The outer end of the plunger or tube 17 is a rigid driving fit in the end 19 of a micrometer barrel 20, which is bored out to rotate and slide upon the outer circumference of the sleeve extension 11.

As shown in Fig. 1, the inner end of the barrel 20 is graduated circumferentially as shown at 21, in addition to which the outer surface of the sleeve 11 is longitudinally graduated as shown at 22. Such graduations enable the amount of movement of the jaws to be readily ascertained, it being understood the graduation markings are preferably arranged to correspond with the actual diameter for which the jaws are adjusted.

In order to enable the jaws to be moved in either direction along the axis of the body, I provide an inner pull-rod or stem 23, extending through the central aperture in the spider 14, having an enlargement or head 24 at its inner end, said head engaging against the outer surface of the spider 14.

The handle end of the pull-rod 23 is threaded as shown at 25 to fit a correspondingly threaded aperture in the center of the locking handle 26, which takes the form of a knurled part, the inner end of which is engaged to abut against the outer end of the barrel 19.

It will be understood that when locking handle 26 is properly adjusted on the threaded end 25 of the pull rod 23, the spider 14 may be made to fit without shake or movement between the head 24 and the end of the plunger 17.

When changing the diameter or adjusting the gauge, it is obviously necessary to permit rotary movement of the parts 17 and 24 with reference to the spider 14, which is relatively stationary, so far as rotary movement is concerned. It is also desirable to have the tool set so as to permit such relative rotary movement to allow of the adjustment of the device, while at the same time eliminating inaccuracy due to an excessive looseness of the parts.

Hence, I find it advisable in practise to set the locking piece 26 on the threaded end 25 of the pull rod in the required position of adjustment and then provide means for preventing the parts from accidentally losing said adjustment; said safety means comprises a small ball 27 which is forced into the small recess 28 in the face of the barrel-end 19 by means of a coiled compression spring 29, contained in an aperture 30, drilled longitudinally in the lock-piece 26. The outer end of said aperture 30 is closed by a screw plug 31, said end being slightly reduced in diameter so as to prevent the ball 27 from becoming lost.

It should be stated that in order to prevent the rod 23 from turning in the plunger 17, when the lock piece 26 is turned for adjustment, the outer end of the said plunger 17 is extended into the inner end of the lock-piece 26 and is slotted as shown at 32, to accommodate a transverse diametric pin 33 in the pull-rod 23.

In using my improved plug gauge, I find it desirable in certain instances to be able to lock the jaws of the device against movement after they have been set to some particular or desired diameter. Such locking is readily effected by tightening up the lock-piece 26 so as to clamp the spider 14 tightly between the end of the plunger 17 and the shoulder of the pull rod head 24.

It will be understood that the ball 27 does not absolutely prevent movement of the lock piece 26, which can still be rotated in order to effect such clamping action.

It will be manifest to those skilled in the art that my improved device is capable of a wide variety of different uses and applications in the tool-room, and effects a marked economy especially when compared with the former practise of preparing special plug gauges for each particular job involving a slightly different diameter or aperture.

The device is also of great utility as a micrometer for measuring the diameter of a hole or aperture which is being worked on, and also of service as a rigid plug gauge for insertion in an aperture, the distance of which from some other point or part is to be ascertained.

Although I have described my invention in considerable detail, it will be understood that the scope of the invention is not limited by the description of said details, but should be determined by reference to the appended claims, said claims being construed as broadly as possible, consistent with the state of the art.

I claim—

1. A plug gauge comprising a cylindrical body provided with a sleeve extension coaxial with the said body, said body being formed with a series of symmetrically disposed guideways inclined at an angle to the axis of the body, jaws slidably fitting in corresponding guideways, a centrally disposed radially extending non-rotary member having means engaging said jaws for moving the same longitudinally, a plunger contained within said sleeve extension threaded therein and having an end engaging said member, a rod contained within said plunger and having an enlargement for engaging the opposite side of said member, and means for forcing said enlargement towards said plunger to lock said plunger against rotary movement in said sleeve.

2. A plug gauge comprising a cylindrical body provided with a sleeve extension coaxial with the said body, said body being formed with a series of symmetrically disposed guideways inclined at an angle to the axis of the body, jaws slidably fitting in corresponding guideways, a centrally disposed radially extending non-rotary member having means engaging said jaws for moving the same longitudinally, a plunger contained within said sleeve extension threaded therein and having an end engaging said member, a rod contained within said plunger and having an enlargement for engaging the opposite side of said member, and means for forcing said enlargement towards said plunger to lock said plunger against rotary movement in said sleeve, said means comprising a lock-piece carried by said plunger and having threaded engagement with said rod.

3. A plug gauge comprising a body portion provided with a threaded axial bore and an inclined guideway, a jaw slidable in said guideway, a threaded member fitting within the bore of said body portion and movable longitudinally therein by the relative rotation of said body portion and said member for effecting movement of said jaw in said guideway, and an operating handle fitting over one end of said body portion and connected to said member.

4. A plug gauge comprising a body portion provided with a threaded axial bore and an inclined guideway, a jaw slidable in said guideway; a threaded member fitting within the bore of said body portion and movable longitudinally therein by the relative rotation of said body portion and said member for effecting movement of said jaw in said guideway, an operating handle fitting over one end of said body portion and connected to said member, and means for locking said member within said bore.

GUSTAVE PONCET.